(12) United States Patent
Varnavas et al.

(10) Patent No.: US 8,577,519 B1
(45) Date of Patent: Nov. 5, 2013

(54) RAPIDLY DEPLOYED MODULAR TELEMETRY SYSTEM

(75) Inventors: Kosta A. Varnavas, Madison, AL (US); William Herbert Sims, III, New Market, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 85 days.

(21) Appl. No.: 13/424,898

(22) Filed: Mar. 20, 2012

(51) Int. Cl.
*H04B 7/185* (2006.01)

(52) U.S. Cl.
USPC ............................................. 701/3; 342/352

(58) Field of Classification Search
USPC ............................................. 701/3; 342/352
See application file for complete search history.

(56) References Cited

U.S. PATENT DOCUMENTS

| | | | |
|---|---|---|---|
| 6,807,428 B2 * | 10/2004 | Casaccia | 455/515 |
| 7,103,511 B2 * | 9/2006 | Petite | 702/188 |
| 2009/0289839 A1 * | 11/2009 | McDaniel | 342/352 |
| 2009/0295628 A1 * | 12/2009 | Wilson et al. | 342/356 |
| 2013/0018529 A1 * | 1/2013 | Ploschnitznig | 701/2 |

* cited by examiner

*Primary Examiner* — Mary Cheung
*Assistant Examiner* — Frederick Brushaber
(74) *Attorney, Agent, or Firm* — Absolute Technology Law Group, LLC; James J. McGroary

(57) ABSTRACT

The present invention is a telemetry system, and more specifically is a rapidly deployed modular telemetry apparatus which utilizes of SDR technology and the FPGA programming capability to reduce the number of hardware components and programming required to deploy a telemetry system.

26 Claims, 2 Drawing Sheets

RAPIDLY DEPLOYED MODULAR TELEMETRY SYSTEM

FEDERAL RESEARCH STATEMENT

The invention described herein was made by employees of the United States Government and may be manufactured and used by or for the Government of the United States of America for governmental purposes without the payment of any royalties thereon or therefore.

CROSS REFERENCE

This application is related to U.S. application Ser. No. 13/369,704 entitled "Adaptable Transponder for Multiple Telemetry Systems" and filed on Feb. 9, 2012, and U.S. application Ser. No. 13/424,754, entitled "System for Configuring Modular Telemetry Transponders" and filed on Mar. 20, 2012, which are hereby incorporated by reference in their entireties.

FIELD OF INVENTION

The present invention is a telemetry system, and more specifically is a rapidly deployed modular telemetry system which incorporates flexible design principles of Software Defined Radio (SDR) and Field Programmable Gate Array (FPGA) technology.

TERMS OF ART

Figure 1:
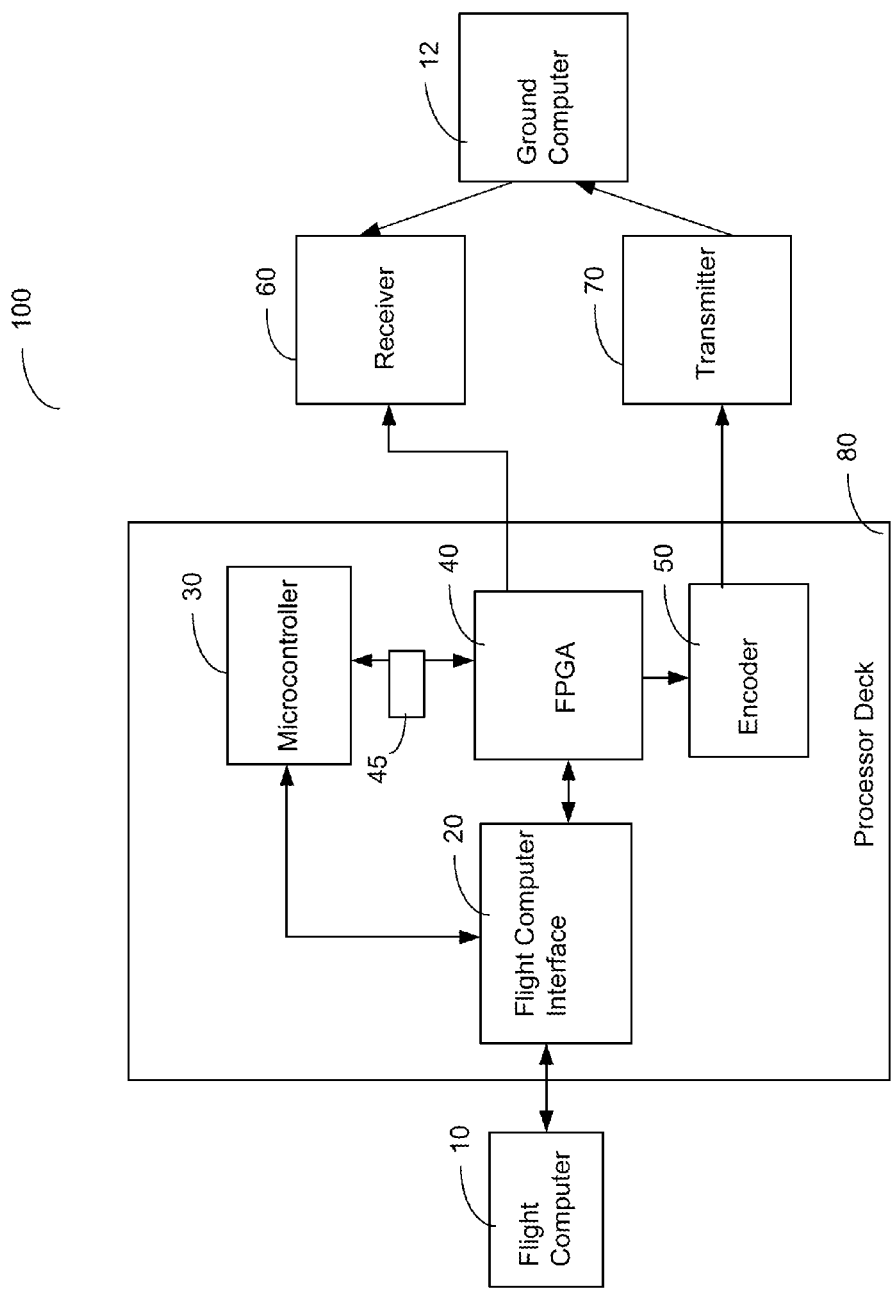
FIG. 1 illustrates an exemplary embodiment of components of a satellite telemetry system, wherein all system components have been prequalified for in flight use by NASA.

As used herein, the term "application specific integrated circuit" or "ASIC" means a computer chip or logic circuit manufactured to perform a specific function, usually involving a large number of gates.

As used herein, the term "ARM processor" means a 32-bit reduced instruction set computer (RISC) instruction set architecture (ISA) developed by ARM Holdings, a commercial processor, or any functional equivalent.

As used herein, the term "BCH error-checking protocol" means a CCSDS protocol that incorporates the BCH multi-level cyclic variable-length digital error-correcting code used to correct multiple random error patterns or any algorithmic and functional equivalent or derivative of this protocol.

As used herein, the term "convolutional code" refers to a type of error-correcting code used to achieve reliable data transfer in digital communication systems. This is a type of channel coding which adds patterns of redundancy to the data in order to improve the signal-to-noise ratio (SNR) for more accurate decoding at the receiving end.

As used herein, the term "CCSDS" means compliant with the standards of the Consultative Committee for Space Data Systems.

As used herein, the term "check module" refers to any hardware or software component which utilizes a watchdog, watchdog timer, heartbeat pulse or combinations thereof to create and maintain a semi-redundant and fault tolerant system between two components.

As used herein, the term "downlink component" refers to any components, including but not limited to filters, synchronizers, error-checking processing components, general packet processing components, or any other components that or facilitate the communication from flight computer (e.g., a satellite) to a ground computer.

As used herein, the term "Field-Programmable Gate Array" or "FPGA" means an integrated circuit that can be programmed after manufacturing to perform the functions of an ASIC.

As used herein, the term "First In, First Out" or "FIFO" refers to the principle organizing and manipulation of data relative to time and prioritization. This expression describes the principle of a queue-processing technique or servicing conflicting demands by ordering the process by handling first the data that arrives first, with data that comes next waiting until the processing the first is finished.

As used herein, the term "forward error correction" or "FEC" means a system of error control for data transmission wherein the sending system adds systematically-generated redundant data to its messages. This allows a receiver to detect and correct errors in the transmission without having to request the retransmission of data.

As used herein, the term "flight computer interface" means a component of a telemetry apparatus that allows that apparatus to communicate or be operatively coupled with the main computer system of a satellite, referred to as the flight computer.

As used herein, the term "Low Density Parity Check" or "LDPC" means a linear error correction code used for transmitting messages that can withstand noisy transmission signals.

As used herein, the term "microcontroller" means a controller on a single integrated circuit containing a processor core, memory, and programmable input/output peripherals.

As used herein, the term "multiplexer" means a telecommunications device that combines several input information signals into one output signal, which carries several communications channels.

As used herein, the term "PIC M32" means a 32-bit commercial microcontroller manufactured by Microchip Technology Inc. or any functionally equivalent device by any other vendor.

As used herein, the term "pseudo-randomization protocol" means a CCSDS protocol that synchronizes data by using a deterministic procedure that produces random numbers within definable limits or any algorithmic and functional equivalent or derivative of this protocol known in the art.

As used herein, the term "Reed-Solomon protocol" means a CCSDS protocol that incorporates the non-binary cyclic error-correcting codes, or any algorithmic and functional equivalent or derivative of this Reed-Solomon protocol known in the art. Reed-Solomon codes are one type of BCH codes.

As used herein, the term "software defined radio" or "SDR" means a radio communications system where components that have been typically implemented in hardware (such as mixers, filters, amplifiers, modulators/demodulators, and detectors) are instead implemented by means of software on an embedded computing device.

As used herein, the term "synchronous 422 interface" means a flight computer interface that complies with the RS-422 standard developed by the American National Standards Institute or any algorithmic and functional equivalent or derivative of this protocol.

As used herein, the term "transponder" means any automatic device that receives, amplifies, and retransmits a signal on a different frequency.

As used herein, the term "telemetry system" refers to technology used by a satellite to transmit data to a monitoring station.

As used herein, the term "turbo code" means a code in the class of high-performance forward error-correction codes used achieve reliable information transfer in the presence of data-corrupting noise.

As used herein, the term "universal asynchronous receiver/transmitter" or "UART" means an individual integrated circuit used for serial communications over the serial port of a computer.

As used herein, the term "uplink components" refers to filters, synchronizers, error-checking processing components, general packet processing components, or any processing components that can interface from a ground computer to a flight computer.

As used herein, the term "Viterbi algorithm" means the algorithm first conceived by Andrew Viterbi for decoding convolutional codes over digital communication links for encryption and auto-ranging.

BACKGROUND

Software Defined Radio (SDR) and Field Programmable Gate Array (FPGA) devices are technologies which allow enormous flexibility in the design of communications components and systems.

Despite the widespread availability of these technologies, they have not been systematically integrated into telemetry system design processes to increase efficiency and reduce cost associated with customizing telemetry systems.

For example, a transponder for a NASA communication system costs more than $500,000. There is currently a need to reconfigure countless hardware components for a specific telemetry application.

Software Defined Radio (SDR) is a term used to refer to technologies which minimizes the amount of analog and radio frequency components needed to convert radio frequencies into digital frequencies. The SDR concept and principles of design use a minimum amount of analog/Radio Frequency components to up/down-convert the RF signal to/from a digital format. Once analog signals are converted to digital signals, all other processing (filtering, modulation, demodulation, etc.) can be done in software rather than with hardware.

A field programmable gate array (FPGA) is an integrated circuit designed to be configured by a user after manufacturing and is a simplified and economical alternative to an application specific integrated circuit (ASIC). In theory, an FPGA can be used to implement any logical function that an ASIC can perform. For example, a user can embed various programming languages, processing functions and FEC error checking protocols into an FPGA.

Error checking protocols are critical to all telemetry systems. Error detection, correction and control enable reliable delivery of digital data over unreliable communication channels without requiring retransmission of data. Error detection techniques allow detecting such errors, while error correction enables reconstruction of the original data.

Error checking protocols are used for both uplink and downlink communications. FEC protocols, in a particular are used for controlling errors over unreliable communication channels.

There are several protocols for telemetry systems that comply with standards developed by the Consultative Committee for Space Data Systems (CCSDS), and which may be used in conjunction for specific telemetry applications. Examples of CCSDS protocols related to telemetry include Reed-Solomon (forward error correction), ASIC BCH (error detection), and Pseudo-Randomization (required for synchronization). These protocols are typically programmed onto microchips and embedded processors that are combined into telemetry systems. Each FEC or detection code may be considered an intellectual property (IP) block that can be added or removed from the design to support mission requirements using proven IP.

There is an unmet need for an optimized telemetry transponder device and system that utilizes the efficiencies and flexibility of SDR and FPGA technology to meet all of NASA's telemetry needs and minimize the cost of expensive reconfiguration.

There is a further unmet need for telemetry systems which can be modularly reconfigured with various CCSDS compliant error checking protocols to accommodate diverse telemetry systems without requiring a complete redesign of a transponder.

SUMMARY OF THE INVENTION

The present invention is a rapidly deployed modular telemetry system comprised of at least one flight computer, at least one microcontroller, at least one FPGA component, at least one error-checking encoder, and at least one flight computer interface. The FPGA is configured with CCSDS compliant software and operatively connected to the microcontroller. The error-checking encoder component is operatively connected with the FPGA to perform at least one error-checking protocol. The flight computer interface is operatively connected with the FPGA and flight computer. The system also includes a receiver deck for receiving signals, a transmitter deck and a power source.

DETAILED DESCRIPTION OF INVENTION

For the purpose of promoting an understanding of the present invention, references are made in the text to exemplary embodiments of satellite telemetry system, only some of which are described herein. It should be understood that no limitations on the scope of the invention are intended by describing these exemplary embodiments. One of ordinary skill in the art will readily appreciate that alternate but functionally equivalent components, materials, and placement may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exemplary embodiment of rapidly deployed modular telemetry (RDMT) system 100. The embodiment shown is designed for use in small and microsatellites. In the embodiment shown, flight computer 10 includes the Command and Data Handling (C&DH) system of the satellite. The C&DH system receives and executes commands; collects, stores, and transmits house-keeping data; and supports the onboard payloads. Flight computer 10 receives data and commands from, and sends data and commands to, processor deck 80 through flight computer interface 20. RMDT system 100 further includes receiver deck 60 and transmitter deck 70.

In the exemplary embodiment shown, processor deck 80 is capable of decoding uplink commands and encoding downlink data in a variety of formats depending on engineering and satellite mission requirements. In the exemplary embodiment shown, processor deck 80 comprises flight computer interface 20, microcontroller 30, field-programmable gate array (FPGA) 40, check module 45, and encoder 50.

As illustrated in FIG. 1, flight computer interface 20 is a balanced, serial interface for the transmission of data and commands. Flight computer interface 20 transfers data and commands from flight computer 10 to FPGA 40 and microcontroller 30, and it then transfers data back to flight computer 10. In further exemplary embodiments, flight computer interface 20 may be a synchronous 422 interface or a universal asynchronous receiver/transmitter (UART).

In the exemplary embodiment shown, microcontroller 30 is the internal watchdog for processor deck 80. In these exemplary embodiments, microcontroller 30 is a PIC M32.

In the exemplary embodiment shown in FIG. 1, FPGA 40 performs decoding and synchronizing functions. In the exemplary embodiment shown, FPGA 40 is an integrated circuit that is operatively connected to flight computer interface 20, microcontroller 30, and encoder 50. FPGA 40 is easily altered via software to perform various functions and to connect with different types of computer hardware.

FPGA 40 is configured with software enabling it to perform various CCSDS protocols, including but not limited to a BCH error-checking protocol and a pseudo-randomization protocol. In addition, FPGA 40 may be modified to include other modules configured with software to perform other CCSDS protocols, depending on the needs of the particular satellite and its mission, such as Turbo codes, convolutional code, Viterbi, encryption, auto-ranging, low density parity check (LDPC), other versions of the BCH error-correcting protocol and variations of FEC codes whether known or unknown. In various other embodiments, FPGA 40 may be a 32 bit ARM processor. In these embodiments, FPGA 40 could include support of other satellite communication systems such as television, music, etc.

In the exemplary embodiment shown, processor deck 80 contains check module 45 operatively connected between microcontroller 30 and FPGA 40. Check module 45 uses multiple levels of watchdogs and heartbeat pulses to create a semi-redundant and fault tolerant system between microcontroller 30 and FPGA 40. While RMDT system 100 may omit check module 45, check module 45 significantly increases reliability of satellite system 100 by giving it the ability to monitor, detect and correct incorrect operation of any component within the SDR, for example, radiation exposure that causes unintentional operation of the SDR. Additionally, check module 45 allows offloading of flight computer 10, and specifically the C&DH system, from tasks associated with telemetry encoding/decoding and data formatting in relation to ground interface activities. Therefore, this allows the C&DH system to send most of the data to the satellite telemetry system 100, and allows the system to conduct the CCSDS protocol framing and decoding/encoding implementing in FPGA 40 and encoder 50.

In the exemplary embodiment shown in FIG. 1, encoder 50 is an application specific integrated circuit (ASIC) configured with Reed-Solomon forward error correction. It detects and corrects multiple random symbol errors to allow for the transmittal of data without potentially corrupting errors. Encoder 50 then transfers data to transmitter deck 70 for transmission to receiving station 12. However, in further exemplary embodiments, the functions of encoder 50 are incorporated into FPGA 40 rather than contained in a separate ASIC. Incorporating these functions onto an FPGA greatly increases the flexibility of the operations and is limited only by the internal space of the device and the imagination of the design engineer(s). In the present embodiment, processor deck 80, transmitter deck 70, and receiver deck 60 are powered by a power deck operating at 200 mW of power.

Figure 2:
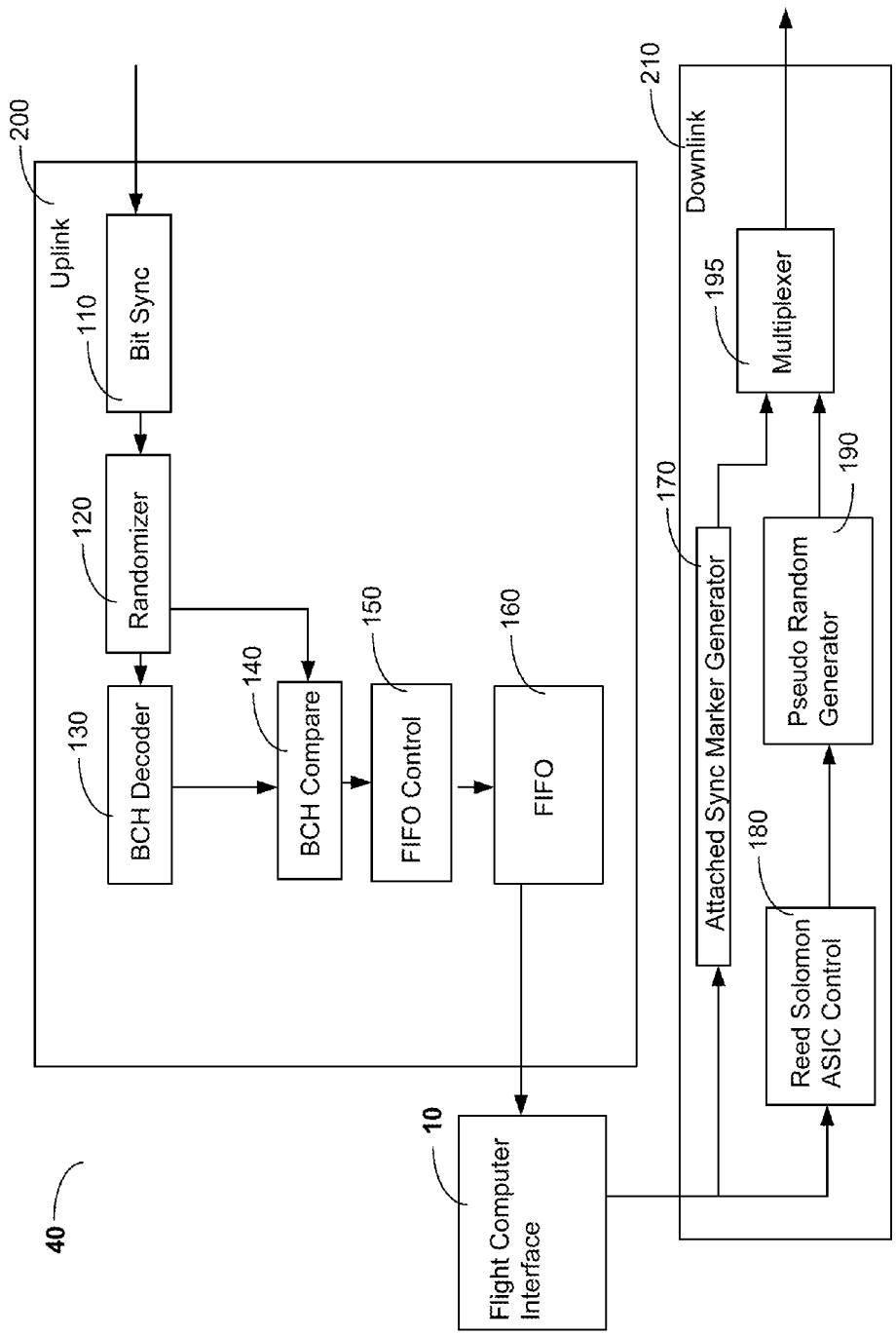
FIG. 2 illustrates an exemplary FPGA configuration to perform telemetry uplink and downlink functions to allow onboard flight computer to communicate with a ground control station.

FIG. 2 is an exemplary embodiment of FPGA 40, which performs uplink function 200 and downlink function 210. In the embodiment shown, the portion of FPGA 40 that handles incoming transmissions from receiver deck 60 (shown in FIG. 1) comprises bit sync 110, randomizer 120, BCH encoder 130, BCH processor 140, first in, first out (FIFO) control processor 150, and FIFO computer chip 160.

In the embodiment shown, bit sync 110 synchronizes the clock of the incoming data stream clock to the internal clock of randomizer 120. BCH encoder 130 then uses internal commands to encode incoming data streams to match the parameters set by programmers of FPGA 40. In the embodiment shown, BCH processor 140 ensures that incoming data has been corrected and matches the internal commands of BCH encoder 130.

In the exemplary embodiment shown in FIG. 2, FIFO control processor 150 controls the activity of FIFO computer 160 and allows for the turning off of the first in, first out capabilities. FIFO control processor 150 can fine-tune the capabilities of FIFO computer chip 160. In the embodiment shown, FIFO computer chip 160 handles all incoming data on a first come, first serve basis, taking care of whatever information is transmitted first, causing the rest of the information to wait for processing.

In the embodiment shown, the portion of FPGA 40 that handles outgoing transmissions sent to transmitter deck 70 (shown in FIG. 1) is comprised of attached sync marker generator 170, Reed-Solomon ASIC control 180, pseudo random generator 190, and multiplexer 195. Reed-Solomon ASIC Control 180 performs forward error correction that detects and corrects multiple random symbol errors. In the embodiment shown, pseudo random generator 190 uses a deterministic procedure to produce numbers that are random, but only within the consistent programming that has been provided. Attached sync marker generator 170 is necessary for the synchronization of the Reed-Solomon ASIC control 180, enabling a proper transmission of data for downlink function 210. In the embodiment shown, ASIC control 180 then consolidates the frequencies of the transmissions into one complex and coherent signal, which is then sent to transmitter deck 70 (shown in FIG. 1).

What is claimed is:

1. A rapidly deployed modular telemetry system comprised of:
    at least one flight computer;
    at least one microcontroller;
    at least one FPGA component configured with CCSDS compliant software, said FPGA being operatively connected with said at least one microcontroller;
    at least one error-checking encoder component operatively connected with said microprocessor to perform at least one error-checking protocol;

at least one flight computer interface operatively connected with said at least one FPGA and said at least one flight computer;

at least one receiver deck;

at least one transmitter deck; and at least one power source.

2. The telemetry system of claim 1 wherein said at least one error-checking encoder is configured with software to perform the Reed-Solomon protocol to create at least one telemetry data signal.

3. The telemetry system of claim 2 wherein said at least one error-checking encoder configured with software to perform the Reed-Solomon protocol is structurally integrated with said at least one FPGA.

4. The telemetry system of claim 1 wherein said at least one FPGA is configured with software to perform the BCH error checking protocol to create at least one telemetry data signal.

5. The telemetry system of claim 1 wherein said at least one FPGA is configured with software to perform the pseudo randomization protocol to create at least one telemetry data signal.

6. The telemetry system of claim 1 wherein said at least one error-checking encoder is structurally integrated with said at least one FPGA to perform at least one CCSDS complaint error-checking protocol.

7. The telemetry system of claim 1 wherein said FPGA is configured with software to perform CCSDS protocols selected from the group consisting of Turbo codes, convolutional code, Viterbi, encryption, auto-ranging, low density parity check, other versions of the BCH error-correcting protocol and combinations thereof.

8. The telemetry system of claim 1 wherein said at least one microcontroller is a PIC M32.

9. The telemetry system of claim 1 wherein said flight computer interface is a synchronous 422 interface.

10. The telemetry system of claim 1 wherein said flight computer interface is a universal asynchronous receiver/transmitter (UART) interface.

11. The telemetry system of claim 1 wherein said at least one power source is at least 200 mW.

12. The telemetry system of claim 1 further including a check module operatively connected between said at least one FPGA and said at least one microcontroller.

13. The telemetry system of claim 1 wherein said at least one FPGA performs telemetry uplink processing with uplink processing components consisting of filters, synchronizers, error-checking and general packet processing components that can interface to said at least one flight computer.

14. The telemetry system of claim 1 wherein said at least one FPGA performs telemetry uplink processing with uplink processing components selected from the group consisting of bit syncs, randomizers, BCH encoders, BCH processors, FIFO control processes, FIFO computer chips and combinations thereof.

15. The telemetry system of claim 1 wherein said FPGA performs telemetry downlink processing with downlink processing components consisting of forward error-correction and additional packet processing software components that can interface to said at least one flight computer.

16. The telemetry system of claim 1 wherein said FPGA performs telemetry downlink processing with downlink processing components selected from the group consisting of sync marker generator, Reed-Solomon ASIC control, pseudo random generator, multiplexer and combinations thereof.

17. A telemetry system for a micro satellite comprised of:

at least one transmitter which transmits at least one telemetry signal to at least one flight computer interface;

at least one interchangeable FEC error checking encoder comprised of a single FPGA into which an FEC error checking protocol has been embedded;

at least one receiver; and at least one power source, wherein all other processing, error checking, modulation and demodulation are performed on said single FPGA.

18. The telemetry system of claim 17 wherein said FEC error checking protocol is a Reed-Solomon error checking protocol.

19. The telemetry system of claim 17 wherein said FPGA is further configured to perform convolutional encoding.

20. The telemetry system of claim 17 wherein said FPGA is a 32-bit ARM processor.

21. The telemetry system of claim 17 wherein said at least one interchangeable FEC error checking encoder is configured with CCSDS-compliant software.

22. The telemetry system of claim 17 further including at least one microchip operatively connected to said FPGA and said flight computer interface.

23. The telemetry system of claim 22 wherein said at least one microchip is a PIC M32 commercial chip.

24. The telemetry system of claim 17 wherein said at least one interchangeable FEC error checking encoder is configured with software to perform the Reed-Solomon error checking protocol to create at least one telemetry data signal.

25. The telemetry system of claim 17 wherein said at least one interchangeable FEC error checking encoder is configured with software to perform the BCH error checking protocol to create at least one telemetry data signal.

26. The telemetry system of claim 17 wherein said at least one interchangeable FEC error checking encoder is configured with software to perform the pseudo randomization error checking protocol to create at least one telemetry data signal.

* * * * *